United States Patent [19]
Choi

[11] Patent Number: 5,715,137
[45] Date of Patent: Feb. 3, 1998

[54] APPARATUS FOR PROVIDING TILTING AND ROTATIONAL MOVEMENTS WITH PINION GEARS AND RACK

[75] Inventor: Yong-Hwan Choi, Seoul, Rep. of Korea

[73] Assignee: Daewoo Electronics Co., Ltd., Seoul, Rep. of Korea

[21] Appl. No.: 733,549

[22] Filed: Oct. 18, 1996

[30] Foreign Application Priority Data

Oct. 19, 1995 [KR] Rep. of Korea ............... 1995-36212

[51] Int. Cl.$^6$ .................................................. G06F 1/16
[52] U.S. Cl. ................................... 361/681; 248/923
[58] Field of Search ................ 364/708.1; 248/292.12, 248/404, 917–923; 361/681–683

[56] References Cited

U.S. PATENT DOCUMENTS

| | | |
|---|---|---|
| 4,549,710 | 10/1985 | Prince et al. |
| 4,554,590 | 11/1985 | Chelin et al. |
| 4,616,218 | 10/1986 | Bailey et al. ............ 248/920 X |
| 4,690,362 | 9/1987 | Helgeland ............... 248/920 X |
| 4,905,543 | 3/1990 | Choi ........................ 248/922 X |
| 5,124,805 | 6/1992 | Chung et al. |

FOREIGN PATENT DOCUMENTS

| | | |
|---|---|---|
| 0 312 355 | 4/1989 | European Pat. Off. |
| 0 546 477 | 6/1993 | European Pat. Off. |
| 2607219 | 5/1988 | France ................... 248/404 |
| 2 206 464 | 1/1989 | United Kingdom |
| 9 301 700 | 1/1993 | WIPO |

*Primary Examiner*—Michael W. Phillips
*Attorney, Agent, or Firm*—Pennie and Edmonds, LLP

[57] ABSTRACT

An apparatus for providing tilting and rotational movements of a display panel. The apparatus includes a first device for tilting the display panel toward or away from a viewer and a second device for rotating the display panel in sidewise directions. The first device has a supporting member for supporting the display panel and a pair of connecting members for connecting the display panel with the supporting member. The connecting members have spring loaded balls for rotatable engagement of the supporting member with the display panel. The second device has a pinion for driving the display panel and a power conveying unit for conveying the power from the driving pinion. The power conveying unit has a rack divided into a first gear portion and a second gear portion engaged with the driving pinion, and a driven pinion coupled to the supporting member and having a gear portion engaged with the first gear portion of the rack.

20 Claims, 2 Drawing Sheets

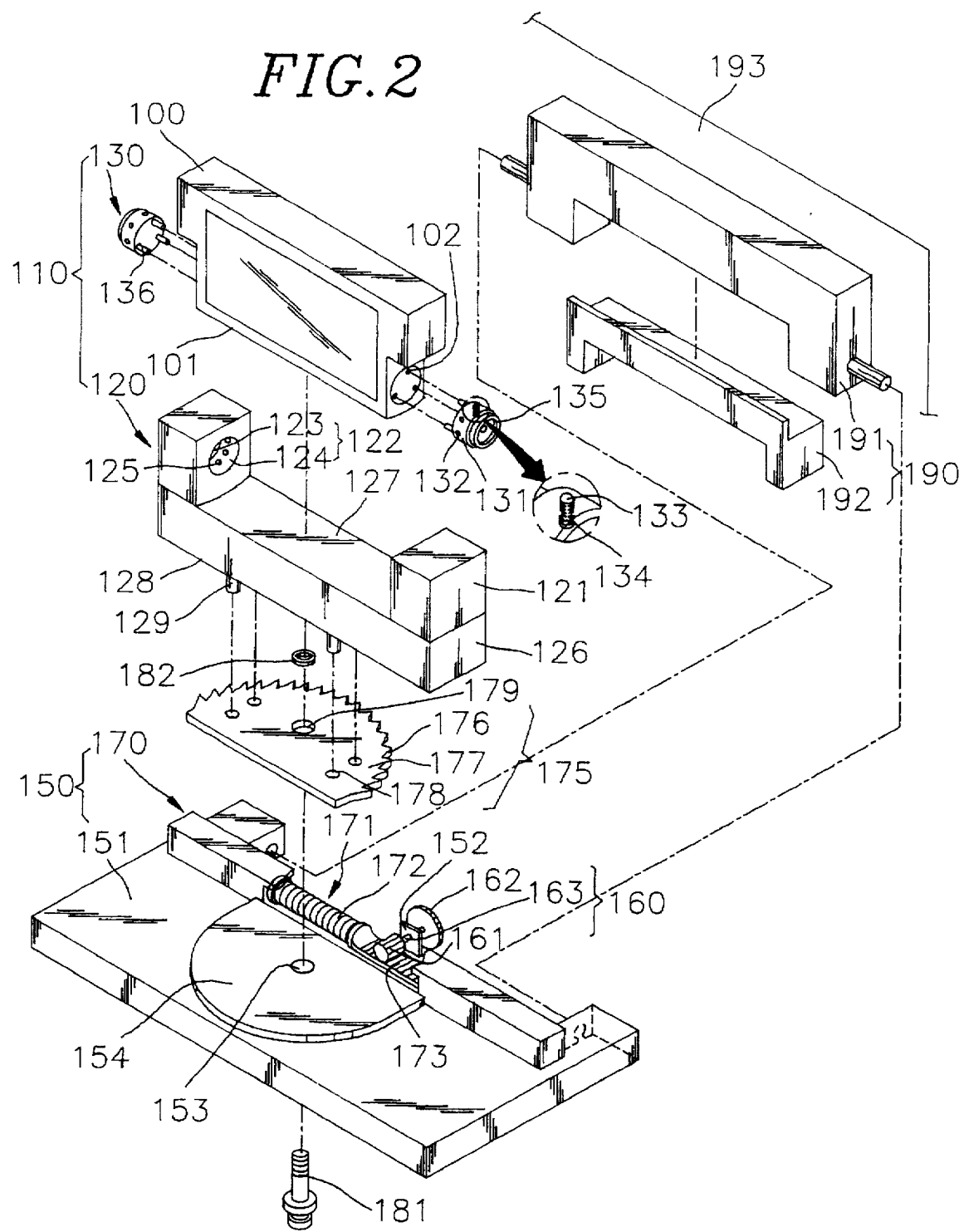

5,715,137

APPARATUS FOR PROVIDING TILTING AND ROTATIONAL MOVEMENTS WITH PINION GEARS AND RACK

FIELD OF THE INVENTION

The present invention relates to a visual display system; and more particularly, to an apparatus capable of providing tilting and rotational movements of a visual display panel therein toward or away from a viewer and rotational movement thereof in sidewise directions.

BACKGROUND OF THE INVENTION

Visual display terminals are often required to be viewed by viewers under various different conditions, i.e., under various different angles and lighting conditions. One of the problems faced by the viewers in viewing the terminals is the difficulty in appropriately positioning the display terminals so that the display can be easily and clearly viewed. A number of mounting mechanisms have been developed for adjusting the position of relatively large and bulky display terminals such as cathode ray tube terminals. However, advances in technology allowed the bulky cathode ray tube terminals to be replaced by terminals which are lighter and occupy less space, e.g., flat terminals such as liquid crystal displays ("LCD") or plasma display panels ("PDP"). The flat terminals are usually installed in housing units which are essentially flat and do not have the weight distribution normally found in the cathode ray tube display terminals. Consequently, the various mechanism devised for the cathode ray tube terminals often is of no use in the flat terminals.

There is shown in FIG. 1, a tilt angle adjusting apparatus disclosed by Robert G. Malick in U.S. Pat. No. 4,669,694 capable of allowing the display terminal device to be set to any of a number of tilt angles.

As shown, a tiltable display unit housing 16 is attached by means of a hinge arrangement 15 to a base unit 12 and a tilt adjusting apparatus 10 for controlling the tilt angle of the housing 16. The base unit 12 includes a vertically extending support member 14 and a base unit housing 13 extending generally horizontally. The housing 13 provides support for the vertical member 14 and an enclosure for electronic components. The display unit housing 16 supports a flat display 17 and encloses associated electronic components. A hinge member 18 which is attached to the back wall 6 of housing 16 pivots on a hinge pin 19 of hinge arrangement 15. The tilt adjusting apparatus 10 includes a strut 20 extending from the vertical support member 14 through slot 25 in the back wall 6 of housing 16. The strut 20 may be released from a fixed position in the slot 25 by operation of lever 51, thereby allowing the housing 16 to be tilted about the hinge pin 19. This allows the display unit housing 16 to be tilted forward or backward about the horizontal axis of the hinge arrangement 15.

The tilt angle adjusting apparatus disclosed by Malick has a major shortcoming in that it allows the display unit housing to be tilted only forward or backward about the horizontal axis of the hinge arrangement. In other words, it is incapable of providing rotational movements of the display unit housing in sidewise direction.

SUMMARY OF THE INVENTION

It is, therefore, an object of the present invention to provide an apparatus capable of providing tilting movements of a visual display panel toward or away from the viewer and rotational movements in sidewise directions.

Another object of the present invention is to provide an apparatus capable of providing rotational movements of a visual display terminal in sidewise directions.

In accordance with one aspect of the present invention, there is provided an apparatus for providing tilting and rotational movements of a display panel, comprising: a first device for tilting the display panel toward or away from a viewer including a supporting member for supporting the display panel and a pair of connecting members for connecting the display panel with the supporting member, and a second device for rotating the display panel in sidewise directions mounted on a base including a driving element for driving the display panel and a power conveying unit for conveying the power from the driving element to the supporting member, thereby providing tilting and rotational movements of the display panel toward or away from a viewer and in sidewise directions, respectively.

In accordance with another aspect of the present invention, there is provided an apparatus for providing rotational movements of a display panel in sidewise directions mounted on a base, comprising: a supporting member for supporting the display panel, an driving element for driving the display panel, a power conveying unit for conveying the power from the driving element to the supporting member, thereby providing rotational movements of the display panel in sidewise directions.

BRIEF DESCRIPTION OF THE DRAWINGS

The above and other objects and features of the present invention will become apparent from the following description of preferred embodiments, when taken in conjunction with the accompanying drawings, wherein:

FIG. 2 illustrates an exploded perspective view of the tilting and rotational movements providing apparatus in accordance with the present invention.

DETAILED DESCRIPTION OF THE PREFERRED EMBODIMENTS

Figure 1:
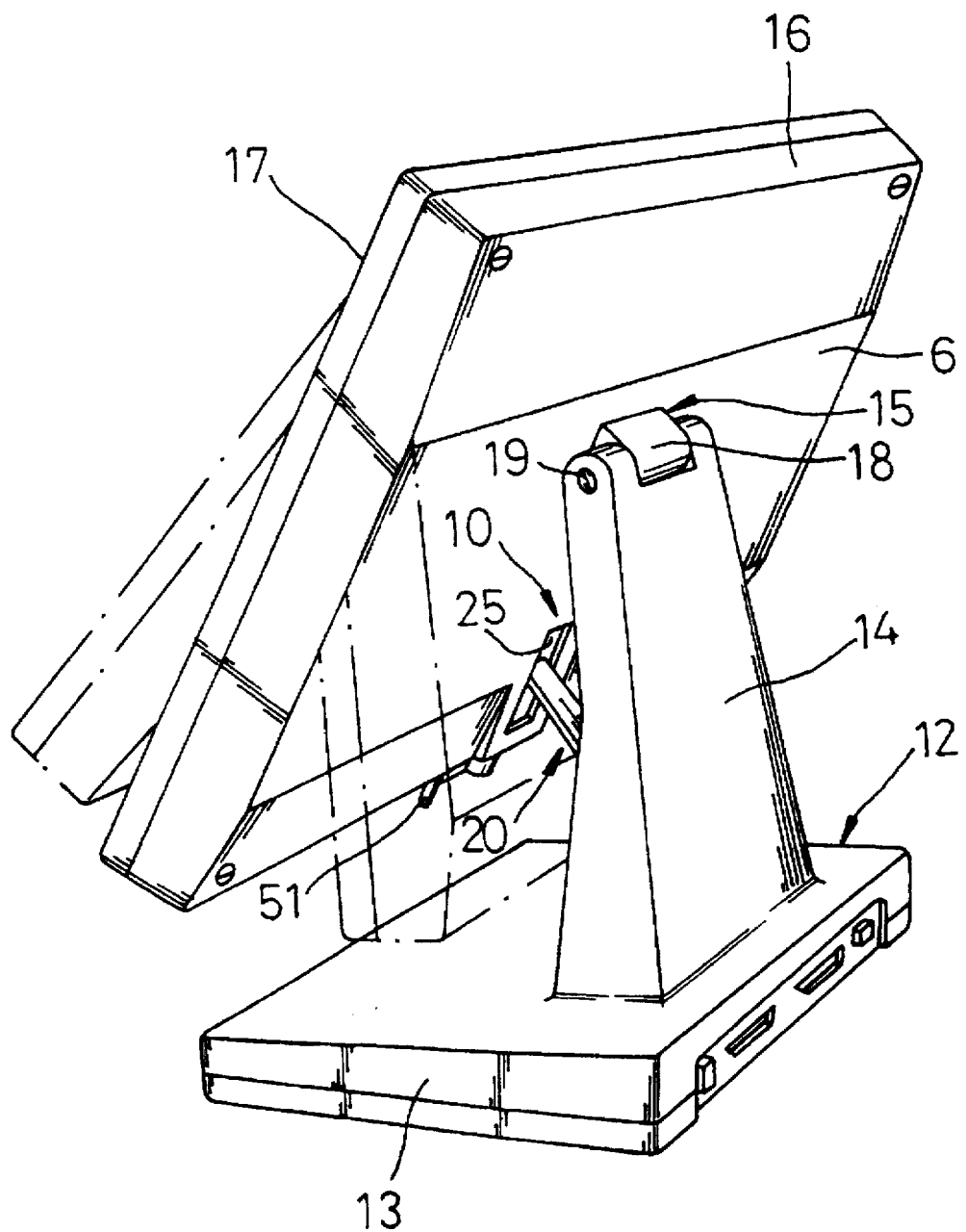
FIG. 1 shows a rear perspective view of a tilt adjusting apparatus previously disclosed.

There is illustrated in FIG. 2, an exploded perspective view of the inventive apparatus capable of providing tilting movements of a display panel 100 toward or away from a viewer and rotational movements thereof in sidewise directions. The apparatus comprises a first device 110 for providing tilting movements of the display panel 100 toward or away from the viewer and a second device 150 for providing rotational movements of the display panel 100 in sidewise directions.

The display panel 100 having a convex bottom surface 101 is formed with a pair of sets of three horizontal holes 102, each set of three holes being symmetrically located on each opposite side and inwardly extending therefrom in such a way that the three horizontal holes 102 on each side are positioned at an equidistance linearly spaced from one another.

The first device 110 includes a ⌣-shaped member 120 for supporting the display panel 100 and a pair of connecting members 130 for rotatable engagement of the supporting member 120 with the display panel 100.

The connecting member 130 has a cylindrical body 131, a guide rib 135 with a smaller diameter than the cylindrical body 131 and an identical number of horizontal pins 136 as that of the horizontal holes 102 of the display panel 100, wherein the guide rib 135 is outwardly extending from the cylindrical body 131 and the horizontal pins 136 are inserted into the horizontal holes 102 of the display panel 100. Furthermore, the cylindrical body 131 of the connecting member 130 is formed with a plurality of cavities 132 on its periphery in such a way that the cavities 132 are positioned at the equidistance circumferentially spaced from one another. Each of the cavities 132 holds a ball 133 and a spring 134 in such a way that a half of the ball 133 protrudes from the periphery of the cylindrical body 131 when no force is applied thereto, but is pushed into the cavity 132 when an appropriate force is applied thereto.

The supporting member 120 is provided with a pair of resilient portions 121 for engaging with the pair of connecting members 130 and a mounting portion 126 for mounting the display panel 100. Each of the resilient portions 121 is formed with an opening 122 divided into a smaller diameter portion 123 receiving the guide rib 135 and a larger diameter portion 124 rotatably receiving the cylindrical body 131 of the connecting member 130. The larger diameter portion 124 is provided with an identical number of recesses 125 as that of the cavities 132 of the connecting member 130 so as to receive the ball 133 therein. The mounting portion 126 has a concave top surface 127 to slidably fit with the convex bottom surface 101 of the display panel 100 when the display panel 100 is rotated, and a bottom surface 128 provided with a plurality of pins 129, e.g., four, as shown in FIG. 2, downwardly extending therefrom (hereinafter, the vertical pin).

The second device 150 is mounted on a base 151 having a supporting plate 152 and a first through hole 153, and includes a pinion 160 for driving the display panel 100 in sidewise rotational directions and a unit 170 for conveying a power from the driving pinion 160 to the display panel 100. The driving pinion 160 has a driving pinion gear portion 161, a knob 162 and a shaft 163. The shaft 163 is supported by the supporting plate 152 and connects the driving pinion gear portion 161 with the knob 162 in such a way that, when the knob 162 is rotated, the driving pinion 160 is allowed to rotate together with the knob 162. The power conveying unit 170 has a rack 171 divided into a first gear portion 172 and a second gear portion 173 engaged with the driving pinion gear portion 161, a driven pinion 175 having a driven pinion gear portion 176 engaged with the first gear portion 172 of the rack 171 and a body portion 177 formed with four vertical holes 178 for accommodating the vertical pins 129 of the supporting member 120. Furthermore, the driven pinion 175 is, on its center, formed with a second through hole 179 to be aligned with the first through hole 153 of the base 151 in such a way that the driven pinion 175 is rotatably mounted on the base 151 using a fastener such as a bolt 181 and a nut 182. The arrangement allows engagement of the display panel 100 with the driving pinion 160. Preferably, a portion of the base 151 on which the driven pinion 175 is mounted is a smooth surface 154 having a small frictional coefficient for an easy rotation of the driven pinion 175.

If desired, the inventive apparatus may include a member 190 for attaching the display panel 100 to a mounting surface for example, a side wall 193. The attaching member 190 has a -shaped piece 191 detachably secured to the base 151 and a matching piece 192 for engaging with the aforementioned -shaped piece 191.

The operating principles of the tilting movement providing apparatus will now be described in detail.

When the viewer pushes or pulls the upper part of the display panel 100, the balls 133 held in the cavities 132 are deviated from the recesses 125 of the supporting member 120 to be fitted into the next recesses 125, thereby tilting the display panel 100 toward or away from the viewer.

When the viewer rotates the knob 162, its driving force is transmitted into the driven pinion 175 via the driving pinion 160, the rack 171 which, in turn, moves the supporting member 120, thereby rotating the display panel 100 in sidewise directions.

While the present invention has been described with respect to certain preferred embodiments only, other modifications and variations may be made without departing from the scope of the present invention as set forth in the following claims.

What is claimed is:

1. An apparatus comprising:

a display panel formed with a set of one or more horizontal holes on each of its two sides;

first means for tilting the display panel toward or away from the viewer, the first means including a supporting member for supporting the display panel and a pair of connecting members for rotatable engagement of the supporting member with the display panel; and second means for rotating the display panel in sidewise directions, wherein each connecting member has a cylindrical body, a guide rib with a smaller diameter than the cylindrical body and an identical number of first pins as that of the horizontal holes, the first pins being inserted into the horizontal holes, and the supporting member has a pair of resilient portions for engaging with the pair of connecting members and a mounting portion for mounting the display panel.

2. The apparatus of claim 1, wherein each of the resilient portions of the supporting member is formed with an opening divided into a smaller diameter portion receiving the guide rib and a larger diameter portion receiving the cylindrical body.

3. The apparatus of claim 2, wherein the cylindrical body of the connecting member is formed with a plurality of cavities on its periphery, each cavity holding a ball and a spring in such a way that a half of the ball protrudes from the periphery of the cylindrical body when no force is applied thereto, but is pushed into the cavity when an appropriate force is applied thereto, and the larger diameter portion of the opening is formed with an identical number of recesses as that of the cavities of the connecting member so as to receive the balls.

4. The apparatus of claim 1, wherein the second means is mounted on a base provided with a supporting plate and includes an element for rotationally driving the display panel in sidewise directions and a unit for conveying a power from the driving element to the display panel.

5. The apparatus of claim 4, wherein the driving element is a pinion which has a driving pinion gear portion, a knob and a shaft connecting the driving pinion gear portion with the knob, the shaft being rotatably supported by the supporting plate.

6. The apparatus of claim 5, wherein the power conveying unit has a rack divided into a first gear portion and a second gear portion engaged with the driving pinion gear portion, a driven pinion having a driven pinion gear portion engaged with the first gear portion of the rack and a body portion formed with a plurality of vertical holes, and the supporting member is provided with an identical number of second pins as that of the vertical holes in such a way that each of the second pins is inserted into one of the vertical holes.

7. The apparatus of claim 6, wherein the portion of the base on which the driven pinion is mounted is a smooth surface having a small frictional coefficient.

8. The apparatus of claim 4, further comprising a member for attaching the display panel to a mounting surface.

9. An apparatus comprising:

a base provided with a supporting plate;

a display panel;

a member for supporting the display panel;

an element for driving the display panel in sidewise rotational directions, said driving element comprising a pinion having a driving pinion gear portion, a knob and a shaft for connecting the gear portion with the knob, the shaft being supported by the supporting plate and a unit mounted on said base for conveying a power from the driving element to the display panel via the supporting member, said unit comprising a rack having first and second gear portions, said second gear portion being engaged with the driving pinion gear portion, a driven pinion having a driven pinion gear portion engaged with the first gear portion, and a body portion formed with a plurality of vertical holes, wherein the supporting member is provided with an identical number of pins as that of the vertical holes in such a way that each of the pins is inserted into one of the vertical holes.

10. The apparatus of claim 9, wherein the portion of the base on which the driven pinion is mounted is a smooth surface having a small frictional coefficient.

11. The apparatus of claim 9, further comprising a member for attaching the display panel to a mounting surface.

12. An apparatus comprising:

a display panel;

first means for tilting the display panel toward or away from the viewer, said first means including a supporting member for supporting the display panel and a pair of connecting members for rotatable engagement of the supporting member with the display panel; and second means for rotating the display panel in sidewise directions, said second means being mounted on a base provided with a supporting plate and including an element for rotationally driving the display panel in sidewise directions and a unit for conveying a power from the driving element to the display panel, wherein the driving element is a pinion having a driving pinion gear portion, a knob and a shaft connecting the driving pinion gear portion with the knob, the shaft being rotatably supported by the supporting plate, the power conveying unit has a rack divided into a first gear portion and a second gear portion engaged with the driving pinion gear portion, a driven pinion having a driven pinion gear portion engaged with the first gear portion of the rack, and a body portion formed with a plurality of vertical holes, and the supporting member is provided with an identical number of pins as that of the vertical holes in such a way that each of the pins is inserted into one of the vertical holes.

13. An apparatus comprising:

a base;

a display panel;

a member for supporting the display panel;

an element for driving the display panel in sidewise rotational directions; and a unit mounted on said base for conveying a power from the driving element to the display panel via the supporting member, said unit comprising a rack divided into a first gear portion and a second gear portion engaged with the driving element, a driven pinion having a driven pinion gear portion engaged with the first gear portion of the rack, and a body portion coupled to the supporting member.

14. The apparatus of claim 13, wherein the driving element is a pinion having a driving pinion gear portion engaged with the second gear portion of the rack, a knob, and a shaft connecting the driving pinion gear portion with the knob, the shaft being supported by a supporting plate provided on the base.

15. The apparatus of claim 14, wherein the body portion is formed with a plurality of vertical holes and the supporting member is provided with an identical number of pins, each of the pins being inserted into one of the vertical holes.

16. The apparatus of claim 15, wherein the driven pinion is mounted on a portion of the base having a smooth surface and a small frictional coefficient.

17. The apparatus of claim 16, further comprising a member for attaching the display panel to a mounting surface.

18. The apparatus of claim 13, wherein the body portion is formed with a plurality of vertical holes and the supporting member is provided with an identical number of pins, each of the pins being inserted into one of the vertical holes.

19. The apparatus of claim 13, wherein the driven pinion is mounted on a portion of the base having a smooth surface and a small frictional coefficient.

20. The apparatus of claim 13, further comprising a member for attaching the display panel to a mounting surface.

* * * * *